June 4, 1957 — E. H. STAU ET AL — 2,794,567
RIVETING TOOL
Filed April 4, 1955 — 2 Sheets-Sheet 1
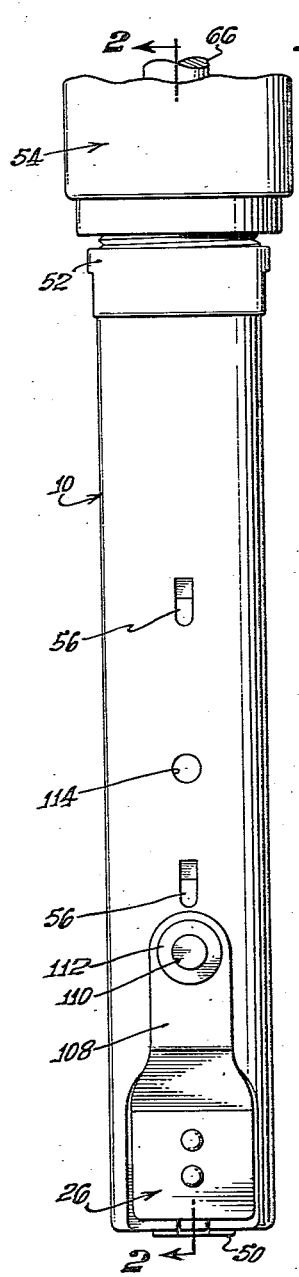
Fig. 1.
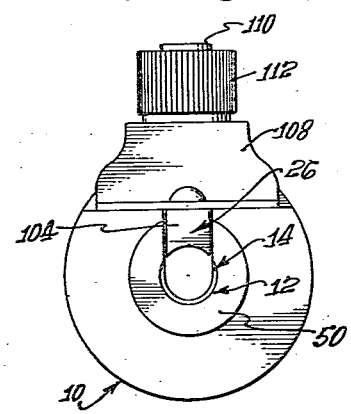
Fig. 5.
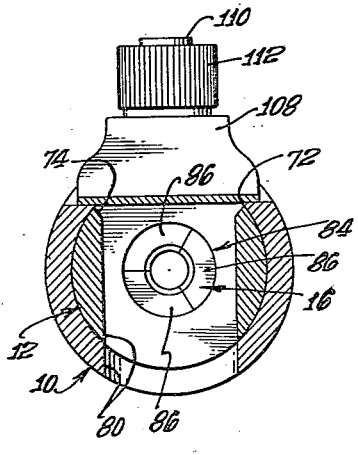
Fig. 6.
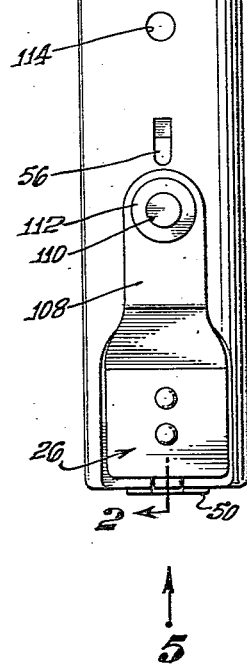
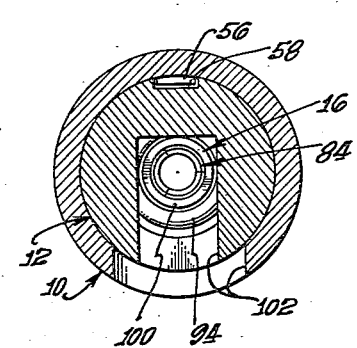
Fig. 7.   Fig. 8.
ELVERT H. STAU,
ROBERT FRANK KOLEC,
INVENTORS.
By their Attorneys.
HARRIS, KIECH, FOSTER & HARRIS.

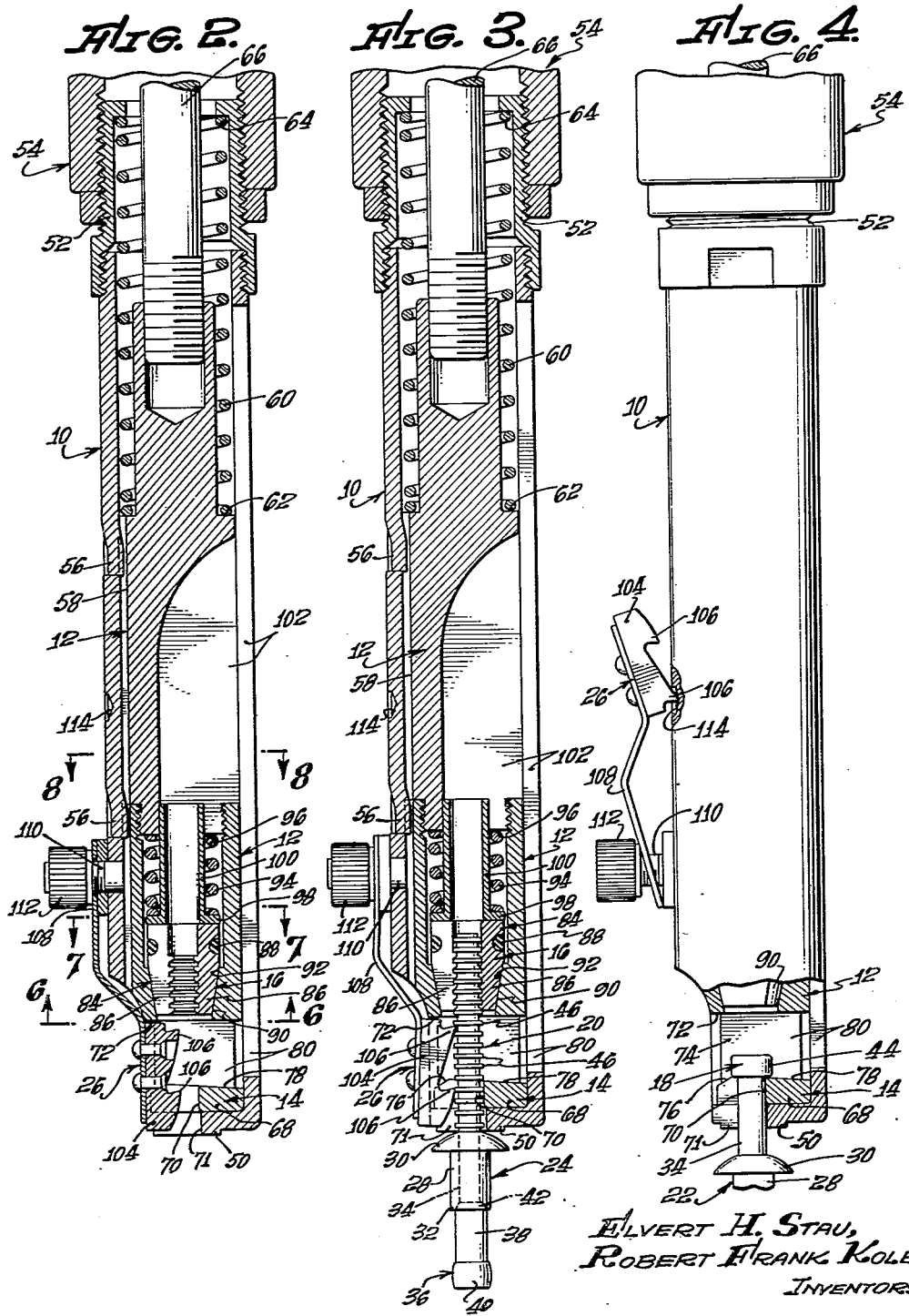

United States Patent Office 2,794,567
Patented June 4, 1957

2,794,567
RIVETING TOOL

Elvert H. Stau, Duarte, and Robert Frank Kolec, Whittier, Calif., assignors to Olympic Screw and Rivet Corporation, Downey, Calif., a corporation of California Application April 4, 1955, Serial No. 499,044

9 Claims. (Cl. 218—42)

The present invention relates in general to riveting tools and, more particularly, to a riveting tool of the type used in connection with setting blind rivet assemblies, wherein the riveting forces are all applied from one side of the work. Blind rivet assemblies are widely utilized in locations where the work is accessible from one side only, although they may be used in other locations also if desired.

A typical rivet assembly capable of being set with the riveting tool of the present invention includes a tubular rivet having a head and a tail and includes a stem extending through the tubular rivet and projecting from the ends thereof. The stem of the rivet assembly is provided adjacent the tail of the tubular rivet with a tail flaring means which expands or flares the tail of the rivet outwardly to set it in response to axial movement of the stem relative to the rivet. Such a rivet assembly is set by a riveting tool which includes a pressure member engageable with the head of the tubular rivet to hold it in place as the stem is moved axially to flare the tail of the rivet. In order to move the stem axially, it is provided adjacent the head of the tubular rivet with means engageable by a gripper or gripping means on a pulling member of the riveting tool which is movable axially relative to the pressure member. Thus, when a rivet assembly of this nature is set by means of a riveting tool of the character described, the gripping means on the pulling member of the tool takes hold of the gripper engageable means on the stem of the rivet assembly adjacent the head of the tubular rivet and pulls the stem of the rivet assembly axially of the tubular rivet so that the tail flaring means on the stem adjacent the tail of the tubular rivet flares the tail of the tubular rivet outwardly to set it, thereby clamping the work between the head of the tubular rivet and the outwardly flared tail thereof. The tail flaring means on the stem of the rivet assembly is either pulled completely through the tubular rivet, or a portion of the stem is broken off and the tail flaring means is left within the tubular rivet. Either procedure may be utilized with the riveting tool of the present invention.

While riveting assemblies with which the riveting tool of the present invention is of particular utility are all of the foregoing general character, the gripper engageable means on the stems thereof differ. For example, one rivet assembly of this type which is in widespread use has a gripper engageable means on the stem thereof which consists of a head under which a gripping element is insertable. Another widely used rivet assembly of this general character is provided on the stem thereof with a gripper engageable means comprising a plurality of projections, of annular or other configurations, engageable by a gripping means which may comprise a chuck, for example. Rivet assemblies with still other gripper engageable means are also possible.

Because of the different types of gripper engageable means on the stems of rivet assemblies of the foregoing general character which are currently in widespread use, it has heretofore been necessary to provide a different riveting tool for each type of gripper engageable means with which the rivet assemblies are provided. This has necessitated maintaining a complete set of riveting tools for each type of gripper engageable means on the stems of the rivet assemblies used, which is obviously expensive and undesirable.

With the foregoing background, the primary object of the present invention is to provide a single riveting tool capable of handling rivet assemblies of the foregoing character having on the stems thereof gripper engageable means of different types, such as the head type or the multiple-projection type hereinbefore discussed. Consequently, the present invention eliminates any necessity for maintaining complete sets of riveting tools for the various types of gripper engageable means, and eliminates switching over to a different type of riveting tool whenever a switch is made from rivet assemblies having one type of gripper engageable means to rivet assemblies having another type thereof, whereby substantial savings in equipment costs, maintenance costs, storage costs, labor costs, and the like, result, which is an important feature of the invention.

More particularly, the primary object of the invention is to provide a riveting tool having a pressure member engageable with the head of the tubular rivet of such a rivet assembly, and having a pulling member movable axially relative to the pressure member and equipped with first and second gripping means respectively engageable with two different types of gripper engageable means on the stems of such rivet assemblies.

Another object is to provide a riveting tool wherein the pulling member is provided with a first gripping means for cooperation with a gripper engageable means of the head type, and is provided with a second gripping means cooperable with gripper engageable means of the multiple-projection type.

Another object is to provide a first gripping means cooperable with the gripper engageable means of the head type comprising a gripping element insertable under the gripping head on the rivet-assembly stem.

Another object is to provide a second gripping means for cooperation with the gripper engageable means of the multiple-projection type comprising a chuck adapted to to grip the annular or other projections.

Another object is to provide a riveting tool having discharge passage means through the pressure and pulling members for the riveting assemblies by the first and second gripping means.

Another object is to provide a riveting tool wherein the pressure and pulling members are provided with access openings for insertion of either type of gripper engageable means into the corresponding gripping means.

Another object is to provide access openings in the sides of the pressure and pulling members for insertion into the first gripping means, gripper engageable means of the head type.

Another object is to provide in the pressure and pulling members access openings in the ends thereof for insertion into the second gripping means, gripper engageable means of the multiple-projection type.

Still another object is to provide movable means on the pressure member engageable with the gripper engageable means of the multiple-projection type through the access openings in the sides of the pressure and pulling members, such access openings being the access openings for the gripper engageable means of the head type, to prevent outward movement of the rivet-assembly stems having thereon gripper engageable means of the multiple-projection type. A related object is to provide the movable means mentioned with at least one tooth engageable with the projections of the gripper engageable means of the multiple-projection type.

The foregoing objects, advantages, features and results of the present invention, together with various other objects, advantages, features and results thereof which will become apparent, may be attained with the exemplary embodiment of the invention illustrated in the accompanying drawings and described hereinafter in detail. Referring to the drawings:

Fig. 1 is a side elevation of a riveting tool which embodies the present invention;

Fig. 2 is a longitudinal sectional view taken along the arrowed line 2—2 of Fig. 1;

Fig. 3 is a longitudinal sectional view duplicating Fig. 2, but illustrating a rivet assembly having on the stem thereof a gripper engageable means on one type in place in the tool;

Fig. 4 is a view which is partially in side elevation and partially in longitudinal section and which illustrates a rivet assembly having a gripper engageable means of another type in place in the tool;

Fig. 5 is an end view of the riveting tool taken as indicated by the arrow 5 of Fig. 1; and Figs. 6, 7 and 8 are transverse sectional views respectively taken along the arrowed lines 6—6, 7—7 and 8—8 of Fig. 2 of the drawings.

Referring to the drawings, the riveting tool of the invention includes pressure and pulling members respectively designated generally by the numerals 10 and 12, the pressure member being held stationary in use and the pulling member 12 being movable axially of the pressure member. The pulling member 12 carries first and second gripping means respectively designated generally by the numerals 14 and 16, and respectively engageable with gripper engageable means 18 and 20, Figs. 4 and 3, respectively, of two different types of rivet assemblies 22 and 24. The riveting tool also includes movable means 26 on the pressure member 10 for engagement with the gripper engageable means 20 of the rivet assembly 24, the means 26 being movable between an operative position, shown in Fig. 3, and an inoperative position, shown in Fig. 4 of the drawings.

Before considering the riveting tool of the invention in more detail, the two rivet assemblies 22 and 24 will be considered, the latter being taken up first for convenience. Referring to Fig. 3 of the drawings, the rivet assembly 24 includes a tubular rivet 28 having a head 30 and a tail 32. Extending through the tubular rivet 28 and projecting from both ends thereof is a stem 34 having thereon, adjacent the tail 32, a tail flaring means indicated generally by the numeral 36. This tail flaring means may include an enlargement 38 of the stem 34, terminating in another enlargement or head 40, the enlargement 38 converging axially at 42 and the tail 32 of the tubular rivet 28 being similarly convergent. As will be apparent, when the stem 34 is moved axially relative to the tubular rivet 28 to draw the tail flaring means 36 into the tail 32 of the rivet, the tail is flared outwardly to clamp the work, not shown, between the outwardly-flared tail and the head 30.

The rivet assemblies 22 and 24 differ only in the gripper engageable means 18 and 20 thereof, the rivet assembly 22 being identical to the rivet assembly 24 as thus far described. Considering the differences between the gripper engageable means 18 and 20 of the two rivet assemblies 22 and 24, the gripper engageable means 18 merely comprises a head 44 on the stem 34. The gripper engageable means 20, on the other hand, comprises a plurality of projections 46, shown as annular, on the stem 34. The stem of the rivet assembly 24 is provided with the annular projections 46 throughout a substantial length, and may be provided with such annular projections into the tubular stem 34 if desired.

Considering the riveting tool now in more detail, the pressure member 10 is provided at one extremity with a pressure element or foot 50 adapted to seat on the head 30 of the tubular rivet 28 of either of the rivet assemblies 22 and 24. At its other end, the pressure member 10 is connected, by means of a fitting 52, to an actuator 54 of any suitable type. For example, the actuator 54 may be pneumatic, hydraulic, mechanical, or the like.

The pulling member 12 is housed within the pressure member 10, which is hollow to receive the pulling member. The latter is axially slidable in the pressure member 10, the pulling member being keyed against rotation relative to the pressure member about the common axis of the pressure and pulling members. Such keying of the pulling member 12 to the pressure member 10 is accomplished conveniently by inwardly struck sections 56 of the pressure member which project into a keyway 58 in the pulling member. The pulling member 12 is biased axially of the pressure member by a compression spring 60 seated on an annular shoulder 62 on the pulling member and an annular shoulder 64 on the fitting 52. The pulling member 12 is retracted axially of the pressure member 10 away from the outer or free extremity of the pressure member by a stem 66 which is connected to a movable component, not shown, of the actuator 54.

The gripping means 14 carried by the pulling member 12 comprises a gripping element 68 over which the head 44 of the gripper engageable means 18 of the rivet assembly 22 is adapted to be placed. In other words, the gripping element 68 is inserted under or behind the head 44, the gripping element 68 and the pressure element 50 having radial slots 70 and 71 extending inwardly from the peripheries thereof to receive the stem 34 of the rivet assembly 22. The width of the slot 70 is less than the diameter of the head 44 so that the latter seats on the gripping element 68. The pressure member 10 and the pulling member 12 are provided with registering access openings 72 and 74 which communicate with the outer end of the slot 70 to permit lateral insertion of the stem 34 of the rivet assembly 22 through the access openings 72 and 74 into the slot 70. The gripping element 68 is provided with two sloping faces 76 and 78 which are engageable by the head 44 on the stem 34 of the rivet assembly 22, the face 76 being engaged by the head as the stem is inserted into the slot 70, and the face 78 being engaged by the head on the stem after the stem has been inserted into the slot 70. It will be noted that the face 78 slopes outwardly toward the pressure element 50 in a direction away from the access openings 72 and 74. With this construction, when the pulling member 12 is moved axially of the pressure member 10 in a direction away from the pressure element 50, the stem 34 of the rivet assembly 22 is forced tightly against the inner end of the slot 70 to hold it in the slot due to the engagement of the sloping face 78 with the head 44 on the stem 34. Thus, the stem 34 of the rivet assembly 22 cannot slip out of the slot 70 as the rivet assembly 22 is set.

It will be understood that, when the gripping means 14 is in operation, the movable means 26 is in its retracted position, as shown in Fig. 4 of the drawings. When the gripping means 16 is in operation, the movable means 26 is in its extended position and, as hereinafter described, projects inwardly through the lateral access openings 72 and 74 in the sides of the pressure and pulling members 10 and 12.

The pressure and pulling members 10 and 12 are provided with openings therein forming a discharge passage means 80 leading to the exterior of the pressure member 10. Through this discharge passage means 80 are expelled the stems 34 of the rivet assemblies 22, or portions broken form the stems 34 of the rivet assemblies 22, depending upon whether the entire stem is pulled through the tubular rivet 28 in setting same, or whether a portion of the stem is broken off in setting the tubular rivet.

Considering the gripping means 16, it is shown as including a collet chuck 84 having three fingers 86 encircled by an elastomeric ring 88 which biases the fingers closed.

The inner faces of the fingers 86 are formed with indentations complementary to and adapted to receive the annular projections 46 on the stem 34 of the rivet assembly 24 to grip same.

The chuck fingers 86, considered collectively, provide a frusto-conical section 90 insertable into a complementary bore 92 in the pulling member 12 to cause the fingers 86 to clamp onto the stem 34 of the rivet assembly 24, thereby gripping same securely. The chuck fingers 86 are biased into the frusto-conical bore 92 by a compression spring 94 which is seated at one end against a shoulder 96 on the pulling member 12 and which is seated at its other end against a flange 98 on a tubular member 100 which, in turn, is seated against the chuck 84. Thus, it will be apparent that the spring 94 and the elastomeric ring 88 cooperate to bias the chuck fingers 86 closed.

The slots 70 and 71 in the gripping element 68 and the pressure element 50 serve as access openings in the ends of the pulling and pressure members 12 and 10 for axial insertion of the stem 34 of the rivet assembly 24 into the chuck 84. The stem 34 of the rivet assembly 24, or a piece broken therefrom, is discharged through the tubular member 100 into a discharge passage means 102 provided by registering openings in the pressure and pulling members 10 and 12. Whether the entire stem 34 is pulled through the tubular rivet 28 in setting the rivet assembly 24, or whether a portion of the stem is broken off in setting the assembly, depends on the type of assembly.

The means 26 comprises a dog 104 which is insertable through the lateral access openings 72 and 74 into engagement with the gripper engageable means 20 on the stem 34 of the rivet assembly 24, the dog 104 having one or more teeth 106 engageable with the annular projections 46 of the gripper engageable means 20. As will be described in more detail hereinafter, the dog 104 prevents rearward or outward movement of the stem 34 of the rivet assembly 24. The dog 104 is carried by a spring arm 108 which is pivotable on a stud 110 on the pressure member 10, the stud having threaded thereon a knurled nut 112 which, when tightened, bears against the spring arm 108 to hold the dog 104 in engagement with the gripper engageable means 20. By loosening the nut 112, the dog 104 may be withdrawn from the access openings 72 and 74, whereupon the spring arm 108 may be swung 180° into its retracted position, as shown in Fig. 4 of the drawings. In order to hold the dog 104 in its retracted position, one of the teeth 106 fits into a recess 114 in the pressure member 10.

Considering the operation of the riveting tool of the invention, its operation in connection with the riveting assembly 24 will be considered first for convenience. Under such conditions, the dog 104 is swung into its operative or extended position, as shown in Fig. 3 of the drawings. The gripper engageable means 20 on the stem 34 of the rivet assembly 24 is then inserted through the end access openings in the pressure and pulling members 10 and 12 which are provided by the slots 70 and 71 in the gripping element 68 and the pressure element 50. The teeth 106 on the dog 104 perform a secondary function here in that they retain the stem 34 of the rivet assembly 24 within the tool even before the stem is inserted into the gripping means 16, the primary function of the dog 104 being considered hereinafter. Continued insertion of the stem 34 of the rivet assembly 24 causes it to enter the chuck 84, the elastomeric ring 88 and the spring 94 yielding to permit this. The insertion of the stem into the gripping means 16 is continued until the pressure element 50 engages the head 30 of the tubular rivet 28 of the assembly 24, whereupon the chuck 84 securely grips the gripper engageable means 20 on the stem. During the foregoing operations, the outer or free end of the pulling member 12 remains seated against the outer or free end of the pressure member 10, due to the action of the spring 60.

After the gripper engageable means 20 on the stem 34 of the rivet assembly 34 has been inserted into the gripping means 16 in the foregoing manner, the actuator 54 is energized to move the pulling member 12 axially of the pressure member 10 in a direction away from the free end of the pressure member 10. This results in setting of the rivet assembly 24 in the manner hereinbefore outlined to clamp the work between the head 30 of the tubular rivet 28 and the outwardly flared tail 32 thereof. Ultimately, the stem 34 of the rivet assembly 24 breaks off at a suitably weakened point, or the entire stem is drawn through the tubular rivet 28. When either of the foregoing occurs, the pulling member 12 is returned to its extended position, wherein its free end seats against the free end of the pressure member 10, this being accomplished by the spring 60, for example. However, the teeth 106 on the dog 104 prevent such outward or forward movement of the whole or broken stem 34 of the rivet assembly 24, whereby the chuck 84 slides forwardly over the stem as the pulling member 12 moves forwardly toward its outer or extended position. Thus, the whole or broken stem 34 of the rivet assembly 24, in effect, advances rearwardly through the chuck 84, this rearward movement being utilized to eject through the discharge passage means 102 a whole or broken stem extracted during setting of a previous rivet assembly 24. Alternatively, the initial insertion of the stem 34 of the rivet assembly 24 into the chuck 84 may be utilized to expel through the discharge passage means 102 a whole or broken stem 34 from a previous setting of a rivet assembly 24. Thus, it will be seen that the primary function of the dog 104 is to prevent outward movement of the whole or broken stem 34 extracted during setting of a rivet assembly 24 as the pulling member 12 is returned outwardly or forwardly towards its extended position.

Considering the operation of the riveting tool of the invention in connection with the rivet assembly 22, the dog 104 is swung into its retracted or inoperative position, as shown in Fig. 4. Then, the stem 34 of the rivet assembly 22 is inserted laterally into the pressure and pulling members 10 and 12 through the lateral or side access openings 72 and 74, thereby inserting the gripping element 68 under the head 44 on the stem of the rivet assembly 22. As hereinbefore discussed, the sloping face 78 insures that the stem 34 will remain in position at the inner end of the slot 70 in the gripping element 68. Thereafter, the actuator 54 is actuated to set the rivet assembly 22 in the manner hereinbefore discussed, the stem 34 of the rivet assembly 22 either being extracted as a unit, or broken off at a suitably weakened point, depending on the type of rivet assembly. The extracted stem 34 of the rivet assembly 22, or a broken portion thereof, is discharged through the discharge passage means 80 in the pressure and pulling members 10 and 12.

Thus, it will be apparent that the present invention provides a riveting tool which may be utilized to set blind rivet assemblies provided with gripper engageable means 18 and 20 of radically different types. The same tool may be utilized for different rivet assemblies, such as the rivet assemblies 22 and 24, thereby eliminating any necessity for acquiring and maintaining a complete stock of riveting tools for different rivet-assembly types, and eliminating time losses in switching over from one type of riveting tool to another.

Although we have disclosed herein an exemplary embodiment of our invention, it will be understood that various changes, modifications and substitutions may be incorporated in the embodiment disclosed without departing from the spirit of the invention as defined by the claims allowed to us and appearing hereinafter.

We claim as our invention:

1. In a riveting tool for use with rivet assemblies which include stems having axially spaced tail flaring means and gripper engageable means, the latter being of different types, and which include tubular rivets on such stems between said tail flaring means and at least portions of said gripper engageable means, said tubular rivets having tails adjacent said tail flaring means and heads adjacent said gripper engageable means, the combination of: two relatively movable members one of which is engageable with said heads of said tubular rivets; first gripping means on the other of said members for engagement with and complementary to said gripper engageable means of one of said types; and a second gripping means on said other member for engagement with and complementary to said gripper engageable means of another of said types, said second gripping means being contractible into engagement with said gripper engageable means of said other type.

2. In a riveting tool for use with rivet assemblies which include stems having axially spaced tail flaring means and gripper engageable means, the latter being of different types, and which include tubular rivets on such stems between said tail flaring means and at least portions of said gripper engageable means, said tubular rivets having tails adjacent said tail flaring means and heads adjacent said gripper engageable means, the combination of: a relatively stationary pressure member engageable with said heads of said tubular rivets; a pulling member movable axially of said pressure member, said pressure and pulling members being provided with access openings in the ends and the sides thereof for insertion thereinto of said gripper engageable means on said stems; first gripping means on said pulling member for engagement with and complementary to said gripper engageable means of one of said types; a second gripping means on said pulling member for engagement with and complementary to said gripper engageable means of another of said types; and movable means on said pressure member and engageable with said gripper engageable means of said other type through said access openings in the sides of said pressure and pulling members.

3. A riveting tool as defined in claim 2 wherein said movable means includes at least one tooth engageable with said gripper engageable means of said other type through the access openings in the sides of said pressure and pulling members, said gripper engageable means of said other type including projections engageable by said tooth.

4. In a riveting tool for use with rivet assemblies which include stems having axially spaced tail flaring means and gripper engageable means, and which include tubular rivets on said stems between at least portions of said gripper engageable means and said tail flaring means, said tubular rivets having tails adjacent said tail flaring means and heads adjacent said gripper engageable means, said gripper engageable means being of two different types one of which comprises heads on said stems, respectively, and the other of which comprises pluralities of projections on said stems, respectively, the combination of: a relatively stationary pressure member engageable with said heads of said tubular rivets; a pulling member movable axially relative to said pressure member, said pressure and pulling members having access openings in the sides thereof for insertion of and complementary to said gripper engageable means of said one type and having access openings in the ends thereof for insertion of and complementary to said gripper engageable means of said other type; first gripping means on said pulling member for engagement with and complementary to said gripper engageable means of said one type; and a second gripping means on said pulling member for engagement with and complementary to said gripper engageable means of said other type.

5. In a riveting tool for use with rivet assemblies which include stems having axially spaced tail flaring means and gripper engageable means, and which include tubular rivets on said stems between at least portions of said gripper engageable means and said tail flaring means, said tubular rivets having tails adjacent said tail flaring means and heads adjacent said gripper engageable means, said gripper engageable means being of two different types one of which comprises heads on said stems, respectively, and the other of which comprises pluralities of projections on said stems, respectively, the combination of: a relatively stationary pressure member engageable with said heads of said tubular rivets; a pulling member movable axially relative to said pressure member, said pressure and pulling members having access openings in the sides thereof for insertion of and complementary to said gripper engageable means of said one type and having access openings in the ends thereof for insertion of and complementary to said gripper engageable means of said other type; first gripping means on said pulling member for engagement with and complementary to said gripper engageable means of said one type, said first gripping means including an element insertable under said heads; and a second gripping means on said pulling member for engagement with and complementary to said gripper engageable means of said other type, said second gripping means including a chuck engageable with said pluralities of projections.

6. A riveting tool as defined in claim 5 including movable means on said pressure member and engageable with said pluralities of projections through the access openings in the sides of said pressure and pulling members, said movable means including at least one tooth.

7. A riveting tool as defined in claim 6 wherein said pressure and pulling members provide discharge passage means for at least portions of said stems.

8. In a riveting tool, the combination of: two relatively movable members one of which is engageable with a part of a rivet of either of two types; first gripping means on the other of said members for engagement with a part of a rivet of one of said types; and a second, contractible gripping means on said other member for engagement with a part of a rivet of the other of said types.

9. In a riveting tool, the combination of: two relatively movable members one of which is engageable with one part of a two-part rivet assembly of either of two types; first gripping means on the other of said members for engagement with the other part of one of said types of rivet assemblies; and a second, contractible gripping means on said other member for engagement with the other part of a rivet assembly of the other of said tyeps.

References Cited in the file of this patent
UNITED STATES PATENTS

| 2,053,718 | Huck et al. | Sept. 8, 1936 |
| 2,713,439 | Dumas | July 19, 1955 |